(12) United States Patent
Hironaka et al.

(10) Patent No.: US 11,948,604 B2
(45) Date of Patent: Apr. 2, 2024

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Hideki Hironaka, Tokyo (JP); Kenji Itou, Fujisawa Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 100 days.

(21) Appl. No.: 17/691,835

(22) Filed: Mar. 10, 2022

(65) Prior Publication Data

US 2023/0091001 A1   Mar. 23, 2023

(30) Foreign Application Priority Data

Sep. 22, 2021   (JP) .................................. 2021-154048

(51) Int. Cl.
G11B 21/10       (2006.01)

(52) U.S. Cl.
CPC .................................... *G11B 21/10* (2013.01)

(58) Field of Classification Search
None
See application file for complete search history.

(56) References Cited

U.S. PATENT DOCUMENTS

| 5,808,438 A * | 9/1998 | Jeffrey ................... G11B 19/04 318/434 |
| 5,821,717 A * | 10/1998 | Hassan .................. G11B 19/28 318/368 |
| 6,396,652 B1 * | 5/2002 | Kawachi .................. G11B 5/54 |
| 6,512,650 B1 * | 1/2003 | Tanner ................... G11B 21/12 |
| 6,636,374 B1 * | 10/2003 | Goh ........................ G11B 19/20 |
| 6,937,429 B2 | 8/2005 | Yoshida et al. |
| 6,972,918 B2 | 12/2005 | Kokami et al. |
| 7,145,742 B2 | 12/2006 | Brenden et al. |
| 2002/0021513 A1 * | 2/2002 | Kaneko .................. G11B 21/12 |
| 2004/0075934 A1 | 4/2004 | Tan et al. |
| 2006/0072237 A1 * | 4/2006 | Kokami ................. G11B 21/02 |
| 2007/0086108 A1 * | 4/2007 | Kuroki ..................... G11B 5/54 |
| 2007/0188906 A1 * | 8/2007 | Ho .......................... G11B 21/12 360/78.04 |
| 2015/0162035 A1 * | 6/2015 | Min ..................... G11B 5/5565 360/75 |

(Continued)

FOREIGN PATENT DOCUMENTS

JP     2008-293557 A     12/2008

*Primary Examiner* — Peter Vincent Agustin
(74) *Attorney, Agent, or Firm* — Allen & Overy LLP

(57) ABSTRACT

According to an embodiment, a magnetic disk device includes a magnetic disk, a magnetic head that accesses the magnetic disk, a motor that moves the magnetic head, a ramp, a motor driver, and a processor. When a voltage value of a power supply voltage falls below a first threshold, the motor driver starts a retract operation of retracting the magnetic head to the ramp by controlling a voltage applied to the motor. When the voltage value of the power supply voltage falls below a second threshold larger than the first threshold, the processor transmits an instruction related to applying a brake to the movement of the magnetic head to the motor driver.

15 Claims, 10 Drawing Sheets

(56) References Cited

U.S. PATENT DOCUMENTS

2018/0096704 A1* 4/2018 Kurosawa .......... G11B 19/2063
2020/0225733 A1* 7/2020 Watanabe .......... G11B 19/2081
2023/0091001 A1* 3/2023 Hironaka ............... G11B 21/12
                                                        360/77.02

* cited by examiner

MAGNETIC DISK DEVICE

CROSS-REFERENCE TO RELATED APPLICATIONS

This application is based upon and claims the benefit of priority from Japanese Patent Application No. 2021-154048, filed on Sep. 22, 2021; the entire contents of which are incorporated herein by reference.

FIELD

Embodiments described herein relate generally to a magnetic disk device.

BACKGROUND

In a magnetic disk device, when power interruption occurs, a retract operation of retracting a magnetic head to a ramp is executed.

DETAILED DESCRIPTION

According to one embodiment, a magnetic disk device includes a magnetic disk, a magnetic head that accesses the magnetic disk, a motor that moves the magnetic head, a ramp, a motor driver, and a processor. When a voltage value of a power supply voltage falls below a first threshold, the motor driver starts a retract operation of retracting the magnetic head to the ramp by controlling a voltage applied to the motor. When the voltage value of the power supply voltage falls below a second threshold larger than the first threshold, the processor transmits an instruction related to applying a brake to the movement of the magnetic head to the motor driver.

Hereinafter, a magnetic disk, device according to an embodiment will be described in detail with reference to the accompanying drawings. Note that the present invention is not limited by the embodiment.

First Embodiment

Figure 1:
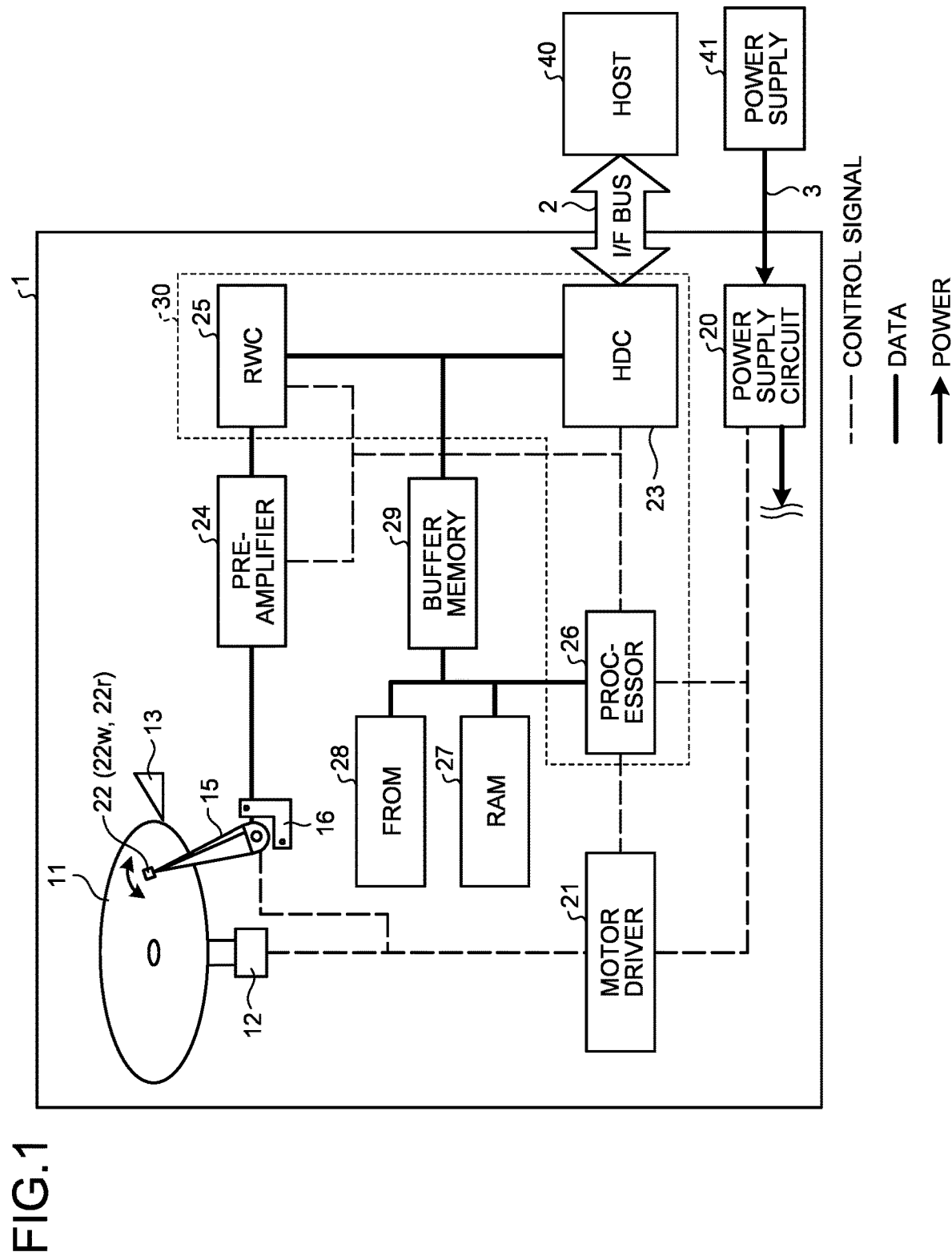
FIG. 1 is a diagram illustrating an example of a configuration of a magnetic disk device according to a first embodiment.

FIG. 1 is a diagram illustrating an example of configuration of a magnetic disk device according to a first embodiment. The magnetic disk device 1 is connected to a host 40 via an interface (I/F) bus 2. In addition, the magnetic disk device 1 is connected to an external power supply 41 via a power supply line 3. The magnetic disk device 1 is operated based on Power supplied from the power supply 41 via the power supply line 3. The power supply 41 may be provided in the host 40. The voltage applied to the power supply line 3 is referred to as a power supply voltage.

The magnetic disk device 1 receives access commands from the host 40. The access commands include a write command requesting writing of data and a read command requesting reading of data.

The magnetic disk device 1 includes one or more magnetic disks 11. In FIG. 1, as can be easily understood, the magnetic disk device 1 includes one magnetic disk 11. The magnetic disk device 1 accesses the magnetic disk 11 in response to the access command. The access to the magnetic disk 11 includes writing data to the magnetic disk 11 and reading data from the magnetic disk 11.

Figure 2:
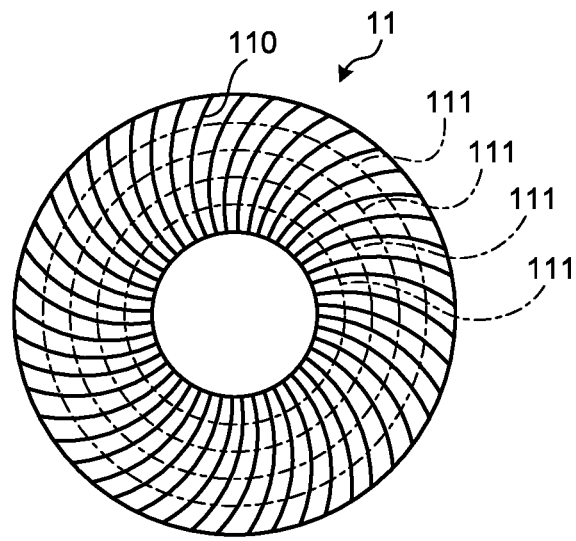
FIG. 2 is a diagram illustrating an example of the configuration of the magnetic disk according to the first embodiment.

FIG. 2 is a diagram illustrating an example of a configuration of the magnetic disk 11 of the first embodiment. Servo information is written on a recording surface of the magnetic disk 11 by, for example, a servo writer before shipment. The servo information includes sector/cylinder information and a burst pattern. The sector/cylinder information gives servo addresses in a circumferential direction and a radial direction of the magnetic disk 11. The sector/cylinder information is used for seek control for moving the magnetic head 22 to a target track. The burst pattern is used for tracking control for maintaining the magnetic head 22 on the target track. The servo information may be written on the magnetic disk 11 after shipment by self-servo write (SSW). FIG. 2 illustrates servo regions 110 arranged radially as an example of arrangement of the servo regions in which the servo information is written.

On the recording surface of the magnetic disk 11, a plurality of concentric tracks 111 having different radii is provided at a predetermined pitch. A large number of sectors are continuously formed on each track 111. Writing of data and reading of data, are executed by the magnetic head 22 for each sector.

The description returns to FIG. 1.

In addition to the magnetic disk 11 and the magnetic head 22, the magnetic disk device 1 includes a spindle motor 12, a ramp 13, an actuator arm 15, a voice coil motor (VCM) 16, a power supply circuit 20, a motor driver 21, a hard disk controller (HDC) 23, a preamplifier 24, a read/write channel (RWC) 25, a processor 26, a random access memory (RAM) 27, a flash read only memory (FROM) 28, and a buffer memory 29.

A configuration including the HDC 23, the RWC 25, and the processor 26 can also be regarded as a controller 30. The controller 30 may include other elements such as the RAM 27, the FROM 28, or the buffer memory 29.

The power supply circuit 20 distributes the power supplied from the power supply 41 to each component of the magnetic disk device 1. The power supply circuit 20 may convert a voltage according to a power supply destination.

The spindle motor 12 rotates the magnetic disk 11 at a predetermined rotation speed about a rotation axis.

The magnetic head 22 accesses the magnetic disk 11 using a write head 22w and a read head 22r provided therein. The write head 22w executes writing to the magnetic disk 11. The read head 22r executes reading from the magnetic disk 11. The magnetic head 22 is attached to a distal end of the actuator arm 15. The magnetic head 22 is moved along the radial direction of the magnetic disk 11 by the VCM 16. For example, when the rotation of the magnetic disk 11 is stopped, the magnetic head 22 is moved onto the ramp 13.

The preamplifier 24 amplifies and outputs a signal read from the magnetic disk 11 at the time of reading data from the magnetic disk 11, and supplies the amplified signal to the RWC 25. In addition, the preamplifier 24 amplifies a signal corresponding to data to be written supplied from the RWC 25 and supplies the amplified signal to the magnetic head 22.

The HDC 23 performs control of transmission and reception of data with the host 40 via the I/F bus 2, control of the buffer memory 29, error correction processing of read data, and the like.

The buffer memory 29 is a buffer memory provided to absorb a difference between an access speed between the host 40 and the magnetic disk device 1 and an access speed to the magnetic disk 11.

The buffer memory 29 includes, for example, a volatile memory capable of high-speed operation. The type of the memory constituting the buffer memory 29 is not limited to a specific type. The buffer memory 29 may be configured by, for example, a dynamic random access memory (DRAM), a static random access memory (SRAM), or a combination thereof.

The RWC 25 code-modulates data to be written supplied from the HDC 23, and supplies the code-modulated data to the preamplifier 24. In addition, the RWC 25 code-demodulates a signal read from the magnetic disk 11 and supplied from the preamplifier 24, and outputs the signal to the HDC 23 as digital data.

The processor 26 is a processing unit such as a central processing unit (CPU) or a digital signal processor (DSP). The processor 26 may include two or more processing units. The RAM 27, the flash read only memory (FROM) 28, and the buffer memory 29 are connected to the processor 26.

The RAM 27 includes, for example, a DRAM, an SRAM, or a combination thereof. The RAM 27 is used as an operation memory by the processor 26. For example, the RAM 27 is used as an area in which a firmware program is loaded or an area in which various types of management data are held.

The FROM 28 is a nonvolatile memory. The processor 26 performs overall control of the magnetic disk device 1 according to a firmware program stored in advance in the FROM 28 and the magnetic disk 11. The processor 26 loads a firmware program stored in advance in the FROM 28 and the magnetic disk 11 into the RAM 27, and executes control of the motor driver 21, the preamplifier 24, the RWC 25, the HDC 23, and the like according to the loaded firmware program.

In particular, the processor 26 controls positioning of the magnetic head 22. In the positioning control, the processor 26 uses the servo information read by the magnetic head 22 as a feedback input to calculate a voltage value of a drive voltage of the VCM 16 required to move the magnetic head 22 to the target position. Then, the processor 26 transmits an instruction value indicating the voltage value obtained by the calculation to the motor driver 21. This instruction value is referred to as a first instruction value. During the positioning control, the processor 26 repeatedly executes the calculation of the first instruction value and the transmission of the first instruction value in a short time period in order to accurately position the magnetic head 22.

The motor driver 21 drives the VCM 16 and the spindle motor 12. In particular, for the VCM 16, a drive voltage having a voltage value indicated by the first instruction value received from the processor 26 is applied to the VCM 16. The VCM 16 is driven by the drive voltage applied from the motor driver 21, and accelerates or decelerates the moving speed of the magnetic head 22.

The motor driver 21 further controls the VCM 16 to execute a retract operation when Power interruption, that is, when the power supply from the power supply 41 is interrupted. Specifically, when a voltage value of the power supply voltage falls below a threshold Thd, the motor driver 21 terminates the driving of the VCM 16 based on the positioning control, and retracts the magnetic head 22 to the ramp 13. The threshold Thd is smaller than a rated voltage value of the magnetic disk device 1. That is, the motor driver 21 detects occurrence of power interruption by detecting a voltage drop of the power supply voltage.

When retracting the magnetic head 22 to the ramp 13, the motor driver 21 repeatedly applies a voltage having a pulsed waveform to the VCM 16 at predetermined time intervals. That is, the motor driver 21 applies a voltage to the VCM 16 in an application pattern in which pulse-on and pulse-off are repeated at predetermined time intervals. The motor driver 21 calculates a state quantity (position or speed) of the VCM 16 based on the counter electromotive force of the VCM 16 during the pulse-off period, and uses the state quantity as a feedback input to determine a wave height of a voltage of a pulsed waveform applied during a subsequent pulse-on period. Hereinafter, the voltage of the pulsed waveform is simply referred to as a pulse.

In the retract operation, the magnetic head 22 cannot be caused to normally ride on the ramp 13 in either case where the speed when the magnetic head 22 rides on the ramp 13 is too fast or too slow. In particular, when a speed at which the magnetic head 22 approaches the ramp 13 exceeds an appropriate level, the magnetic head 22 recoils at the ramp 13, and the magnetic head 22 returns onto the magnetic disk 11. When the magnetic head 22 returns onto the magnetic disk 11, the magnetic disk 11 may be damaged by the magnetic head 22. In order to prevent the scratches on the magnetic disk 11, it is desirable to control the speed of the magnetic head 22 so that the speed at which the magnetic head 22 approaches the ramp 13 does not exceed an appropriate level.

Figure 3:
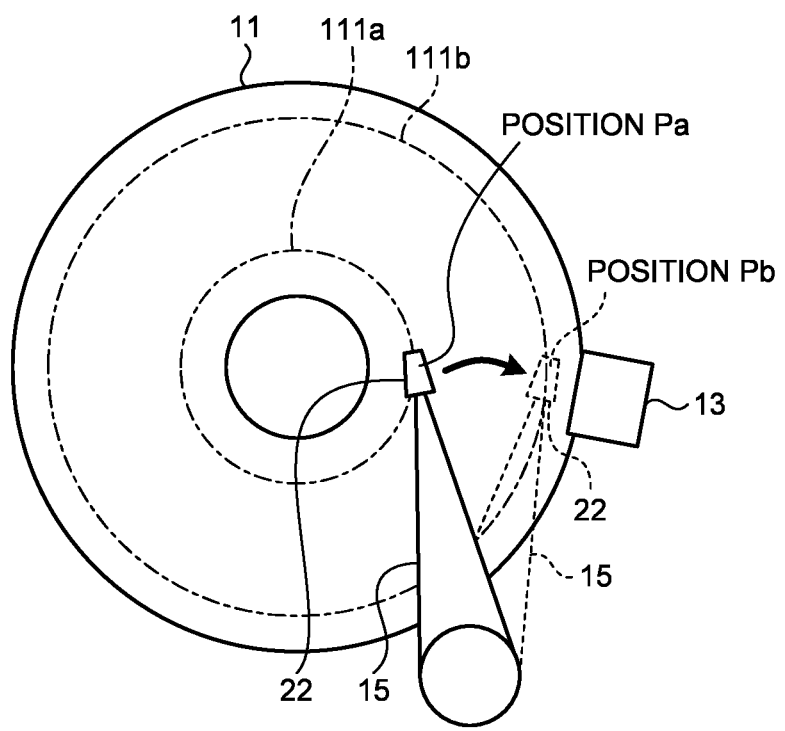
FIG. 3 is a schematic diagram illustrating an example of seek control performed in the magnetic disk device according to the first embodiment.

For example, a case where the magnetic head 22 is moved as illustrated in FIG. 3 under positioning control is considered. FIG. 3 is a schematic diagram illustrating an example of seek control performed in the magnetic disk device 1 according to the first embodiment.

When the magnetic head 22 is moved from a position Pa for accessing a certain track 111a to a position Pb for accessing another track 111b located on an outer peripheral side of the track 111a, the speed of the magnetic head 22 is accelerated in a direction toward the ramp 13, is maintained at a constant speed when the acceleration is completed, and is decelerated so that the magnetic head 22 can be stopped at the position Pb.

In general, in order to shorten the time required for the seek control, a maximum moving speed of the magnetic head in the seek control is fast. The maximum moving speed is above an appropriate level when the magnetic head approaches the ramp. Thus, in a case where the power interruption occurs during the seek control illustrated in FIG. 3 (particularly, before deceleration starts), a sudden brake may be required in order to prevent the speed at which the magnetic head 22 approaches the ramp 13 from exceeding an appropriate level.

Here, a technique to be compared with the first embodiment will be described. The technique to be compared with the first embodiment will be referred to as a comparative example. According to the comparative example, when the occurrence of the power interruption is detected, the retract operation starts in response to the detection of the occurrence of the power interruption. In the retract operation, the motor driver controls the wave height of each pulse so that the speed when the magnetic head rides on the ramp falls within an appropriate range.

However, according to the voltage application pattern in the retract operation, since the state in which the voltage for the brake is applied cannot be maintained, it is difficult to apply a sudden brake to the movement of the magnetic head. Thus, according to the comparative example, the speed when the magnetic head rides on the ramp cannot be reduced to an appropriate level, and the occurrence of scratches on the magnetic disk cannot be prevented in some cases.

On the other hand, according to the first embodiment, the processor 26 detects the occurrence of the power interruption at timing earlier than the motor driver 21. Then, the processor 26 instructs the motor driver 21 to stop the positioning control and apply a brake to the movement of the magnetic head 22 in response to the detection of the occurrence of the power interruption.

More specifically, when the voltage value of the power supply voltage falls below a threshold Thp, the processor 26 detects that the power interruption has occurred. Thp is larger than Thd and smaller than the voltage value of the rated voltage of the magnetic disk device 1. Since the processor 26 uses the threshold Thp larger than the threshold Thd the motor driver 21 uses to detect the occurrence of the power interruption, the processor 26 can detect the occurrence of the power interruption earlier than the motor driver 21. When detecting that the power interruption has occurred, the processor 26 calculates a voltage value of the drive voltage of the VCM 16 to apply a brake to the movement of the magnetic head 22. The voltage value of the drive voltage of the VCM 16 for applying a brake to the movement of the magnetic head 22 is referred to as a brake voltage value. The processor 26 transmits an instruction value indicating the brake voltage value to the motor driver 21. This instruction value is referred to as a second instruction value. The motor driver 21 applies a voltage of a voltage value indicated by the second instruction value, that is, a brake voltage value, to the VCM 16.

When the processor 26 repeats the transmission of the second instruction value, the motor driver 21 can continue to apply a brake to the movement of the magnetic head 22 while receiving the transmission of the second instruction value. Thus, the motor driver 21 can apply a stronger brake to the movement of the magnetic head 22 using the second instruction value than by the retract operation.

That is, according to the first embodiment, as compared with the comparative example, it is possible to apply a strong brake at the time of the power interruption. Therefore, the speed of the magnetic head 22 when the magnetic head 22 rides on the ramp 13 can be reduced to an appropriate level.

Hereinafter, the brake processing implemented by the second instruction value is referred to as a brake operation.

In addition, a direction from an outer peripheral side to an inner peripheral side, in other words, a direction away from the ramp 13 is referred to as a forward direction. A direction from the inner peripheral side to the outer peripheral side, in other words, a direction toward the ramp 13 is referred to as a reverse direction.

Next, an example of transition of the voltage value of the drive voltage applied to the VCM 16 will be described.

Figure 4:
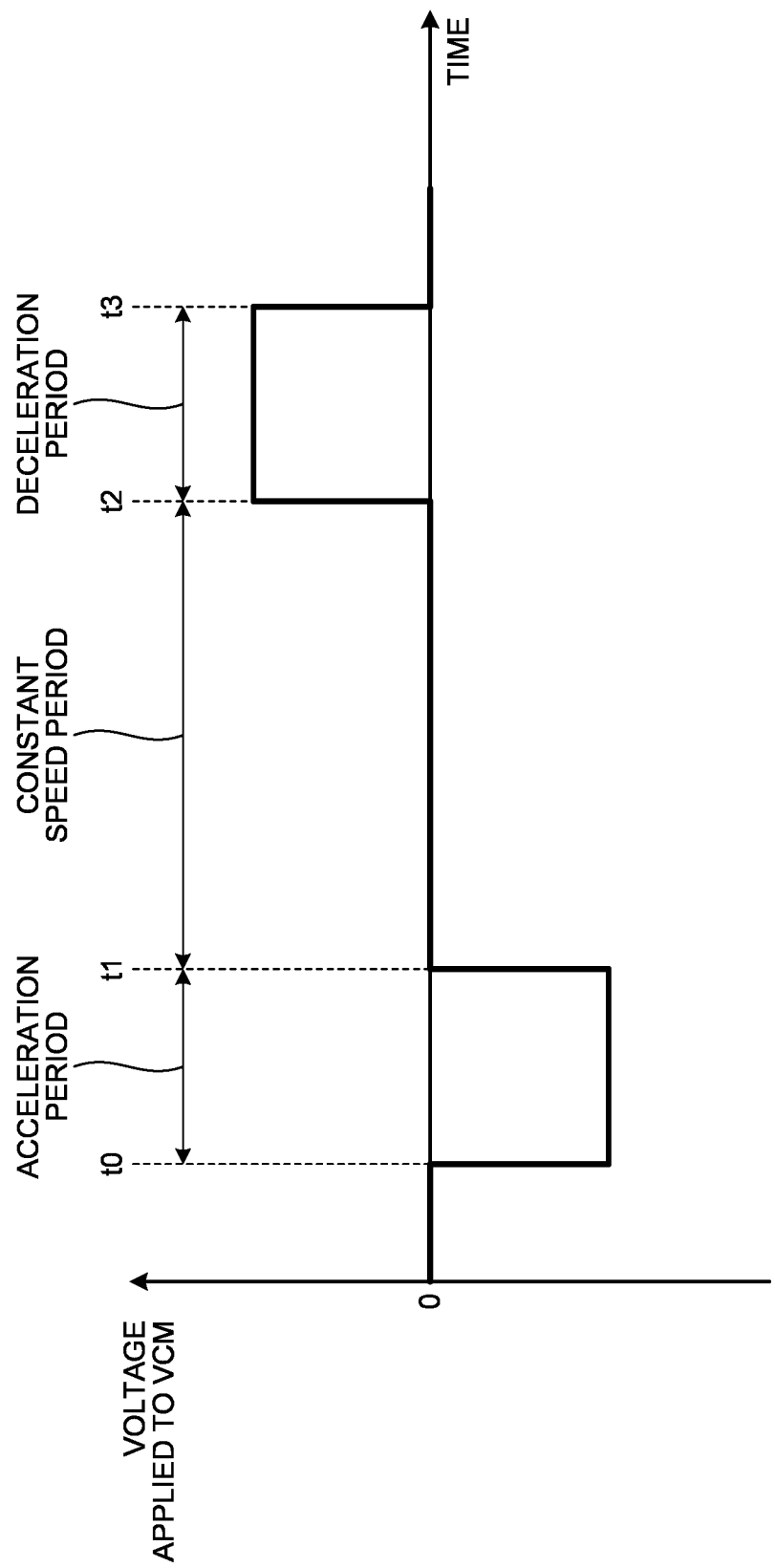
FIG. 4 is a diagram illustrating an example of transition of a voltage value of a drive voltage applied to a VCM of the first embodiment for implementing the seek control illustrated in FIG. 3.

FIG. 4 is a diagram illustrating an example of transition of the voltage value of the drive voltage applied to the VCM 16 of the first embodiment for implementing the seek control illustrated in FIG. 3. In FIG. 4, a vertical axis represents the drive voltage applied to the VCM 16. A horizontal axis represents an elapsed time. In the following drawings, as an example, the VCM 16 accelerates the magnetic head 22 in the forward direction when a drive voltage having a positive voltage value is applied, and accelerates the magnetic head 22 in the reverse direction when a drive voltage having a negative voltage value is applied.

In the seek control, the motor driver 21 controls the voltage applied to the VCM 16 based on the first instruction value received from the processor 26 at, predetermined time intervals. When the magnetic head 22 is at the position Pa, the processor 26 causes the motor driver 21 to start to apply a voltage having a negative voltage value in order to start acceleration of the moving speed of the magnetic head 22 in the reverse direction (timing t0). The application of the voltage having the negative voltage value is continued until timing t1 at which the speed of the magnetic head 22 in the reverse direction reaches a desired speed. That is, in a period from the timing t0 to the timing t1, the moving speed of the magnetic head 22 in the reverse direction increases.

The processor 26 maintains the voltage value of the voltage applied to the VCM 16 at 0 from the timing t1 to timing t2 at which the magnetic head 22 approaches the position Pb. Thus, in a period from the timing t1 to the timing t2, the magnetic head 22 moves in the reverse direction at a constant speed.

The processor 26 causes the motor driver 21 to start to apply a voltage having a positive voltage value at the timing t2 at which the magnetic head 22 approaches the position Pb so that the magnetic head 22 can stop at the position Pb. When the voltage having the positive voltage value is applied to the VCM 16 while the magnetic head 22 moves in the reverse direction, a decrease in the moving speed of the magnetic head 22 in the reverse direction starts. The application of the voltage having the positive voltage value is continued until timing t3 at which the magnetic head 22 stops at the position Pb. Thus, in a period from the timing t2 to the timing t3, the moving speed of the magnetic head 22 in the reverse direction decreases.

When the magnetic head 22 stops at the position Pb (timing t3), the seek control for moving the magnetic head 22 from the position Pa to the Position Pb is completed.

Figure 5:
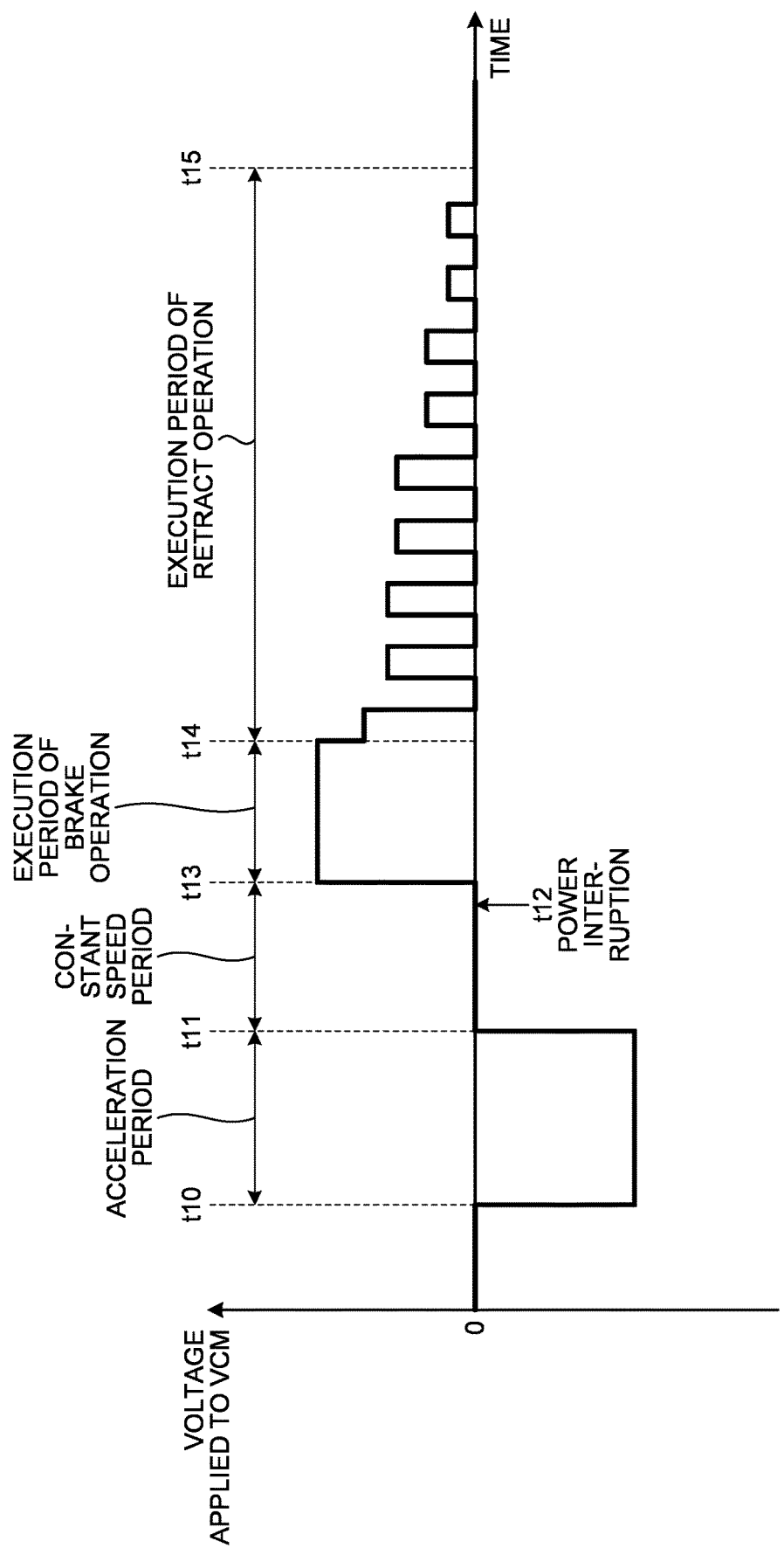
FIG. 5 is a diagram illustrating an example of transition of the drive voltage applied to the VCM of the first embodiment when power interruption occurs during the seek control illustrated in FIG. 3.

FIG. 5 is a diagram illustrating an example of transition of the drive voltage applied to the VCM 16 of the first embodiment when the power interruption occurs during the seek control illustrated in FIG. 3. In FIG. 5, a vertical axis represents the drive voltage applied to the VCM 16. A horizontal axis represents an elapsed time. Here, as an example, a case where the power interruption occurs in a period in which the magnetic head 22 moves at a constant speed will be described.

At timing t10 and timing t11, the processor 26 executes processing similar to the processing executed at the timing t0 and the timing t1 illustrated in FIG. 4. As a result, a period in which the magnetic head 22 moves at a constant speed starts from the timing t11.

When the power interruption occurs at certain timing t12 in a period in which the magnetic head 22 moves at a constant speed, the processor 26 terminates the seek control and starts control of the brake operation. The processor 26 starts the control of the brake operation before the motor driver 21 starts the retract operation.

During the execution period of the brake operation, the processor 26 calculates the brake voltage value and transmits the second instruction value representing the brake voltage value to the motor driver 21. The processor 26 repeats the transmission of the second instruction value at predetermined time intervals. Thus, the brake operation is continued while the transmission of the second instruction value is repeated.

When the voltage value of the power supply voltage falls below the threshold Thd (timing t14), the processor 26 terminates the transmission of the second instruction value, and the motor driver 21 starts the retract operation. That is, the motor driver 21 starts to apply pulses a plurality of times. During the movement of the magnetic head 22, the motor driver 21 controls the wave height of each pulse so that a speed when the magnetic head 22 approaches the ramp 13 is an appropriate speed at which the magnetic head 22 can normally ride on the ramp 13.

When the magnetic head 22 rides on the ramp 13 (timing t15), the retract operation is terminated.

As described above, according to the first embodiment, it is possible to apply a brake to the movement of the magnetic head 22 in advance before the retract operation starts. Thus, even in a case where the power interruption occurs when the magnetic head 22 moves in the reverse direction at a very high speed, it is possible to reduce the speed when the magnetic head 22 rides on the ramp 13 to an appropriate level. As a result, it is possible to suppress damage to the magnetic disk 11.

A mechanism for monitoring the power supply voltage by the processor 26 and the motor driver 21 can be arbitrarily designed.

In one example, as illustrated in FIG. 1, the processor 26 and the motor driver 21 are connected to the power supply circuit 20 via a control signal line. The power supply circuit 20 includes an analog-to-digital converter for acquiring a voltage value of the power supply voltage as a digital value. A signal output from the analog-to-digital converter is transmitted to the processor 26 and the motor driver 21 via the control signal line, and the processor 26 and the motor driver 21 can know the voltage value of the power supply voltage by the received signal.

In another example, each of the processor 26 and the motor driver 21 includes an analog-to-digital converter for acquiring a voltage value of power supplied thereto as a digital value. Each of the processor 26 and the motor driver 21 can know the voltage value of the power supply voltage based on the signal output from the analog-to-digital converter.

In a case where the power supply circuit 20 is configured to distribute power without voltage conversion, each of the processor 26 and the motor driver 21 recognizes a signal output from the analog-to-digital converter included therein as a voltage value of the power supply voltage.

In a case where the power supply circuit 20 is configured to perform voltage conversion and distribute power, each of the processor 26 and the motor driver 21 can execute processing equivalent to comparison between the voltage value of the power supply voltage and the threshold (the threshold Thd and the threshold Thp) by multiplying the signal or the threshold (the threshold Thd and the threshold Thp) output from the analog-to-digital converter included therein by a coefficient.

Next, the operation of the magnetic disk device 1 according to the first embodiment will be described.

Figure 6:
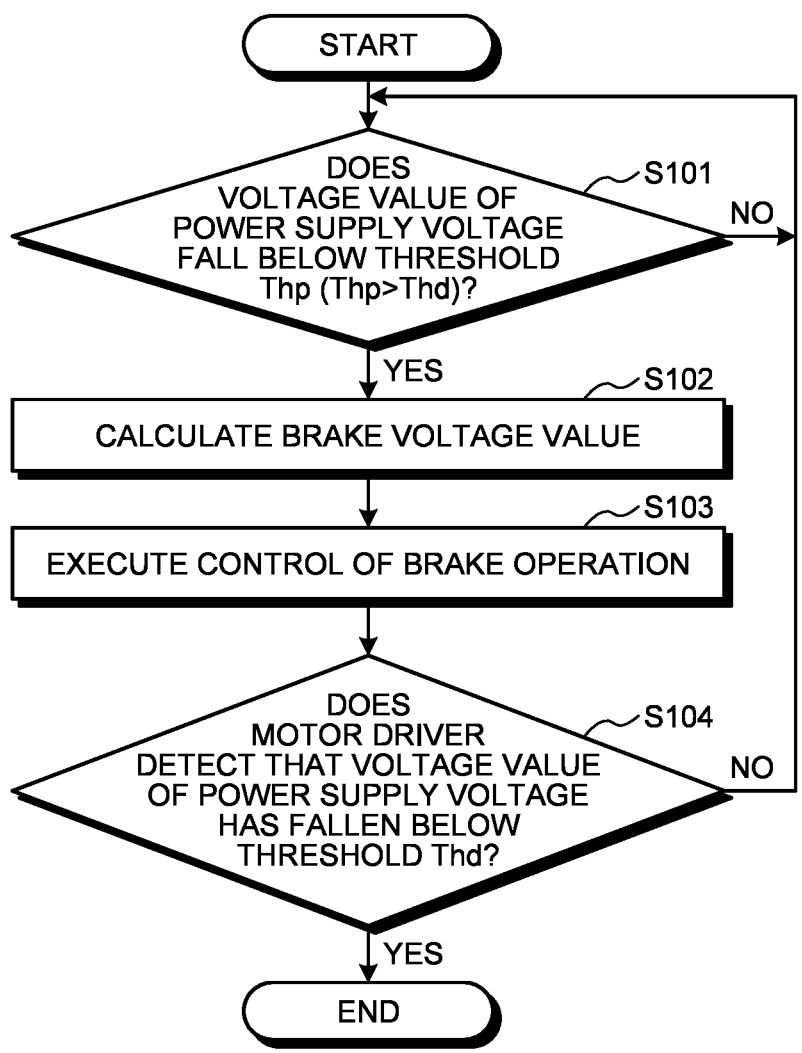
FIG. 6 is a flowchart illustrating an example of an operation of a processor according to the first embodiment.

FIG. 6 is a flowchart illustrating an example of the operation of the processor 26 according to the first embodiment.

The processor 26 determines whether the voltage value of the power supply voltage falls below the threshold Thp (S101). When the voltage value of the power supply voltage is not below the threshold Thp (S101: No), the control returns to S101. The processor 26 repeatedly executes the processing of S101 until it is determined that that the voltage value of the power supply voltage has fallen below the threshold Thp regardless of whether the positioning control is being performed.

When the voltage value of the power supply voltage falls below the threshold Thp (S101: Yes), the processor 26 calculates the brake voltage value (S102).

As a method of calculating the brake voltage value, various methods can be adopted. An example of a method of calculating the brake voltage value will be described with reference to FIGS. 7 and 8.

Figure 7:
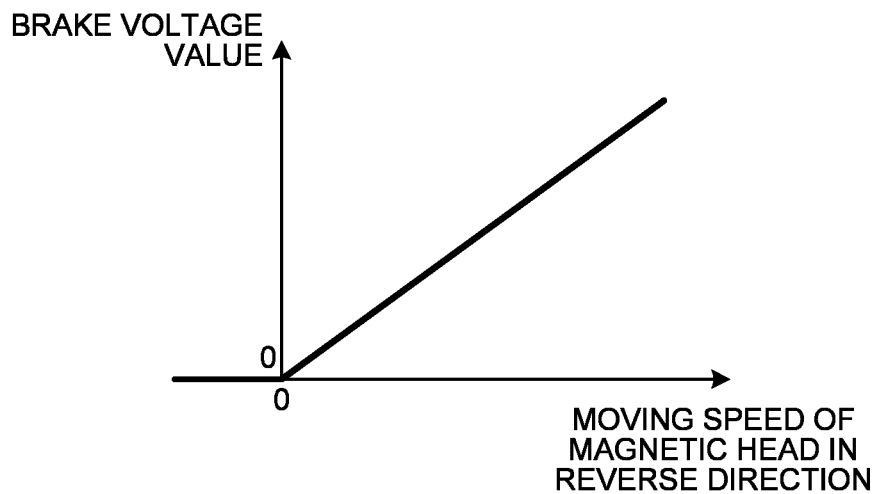
FIG. 7 is a diagram illustrating an example of a relationship between a moving speed in a reverse direction of the magnetic head and a brake voltage value according to the first embodiment.

In one example, the processor 26 acquires the moving speed of the magnetic head 22 in the reverse direction, and calculates the brake voltage value based on the acquired moving speed of the magnetic head 22 in the reverse direction. For example, as illustrated in FIG. 7, the brake voltage value increases as the moving speed of the magnetic head 22 in the reverse direction increases. In order to reduce the moving speed of the magnetic head 22 to an appropriate level when the magnetic head 22 rides on the ramp 13, a larger deceleration amount is required as the moving speed of the magnetic head 22 in the reverse direction increases. According to the calculation method illustrated in FIG. 7, this requirement can be satisfied.

According to the example illustrated in FIG. 7, when the moving speed of the magnetic head 22 in the reverse direction is negative, that is, when the magnetic head 22 moves in the forward direction, the brake voltage value is set to 0. The method of calculating the brake voltage value when the magnetic head 22 moves in the forward direction is not limited thereto. The processor 26 may acquire a negative brake voltage value so that the moving speed of the magnetic head 22 can be reduced even when the magnetic head 22 moves in the forward direction.

A relationship between the moving speed of the magnetic head 22 in the reverse direction and the brake voltage value is not limited to a linear relationship illustrated in FIG. 7. For example, the relationship between the moving speed of the magnetic head 22 in the reverse direction and the brake voltage value may be defined so that the brake voltage value is changed stepwise according to the moving speed of the magnetic head 22 in the reverse direction.

Figure 8:
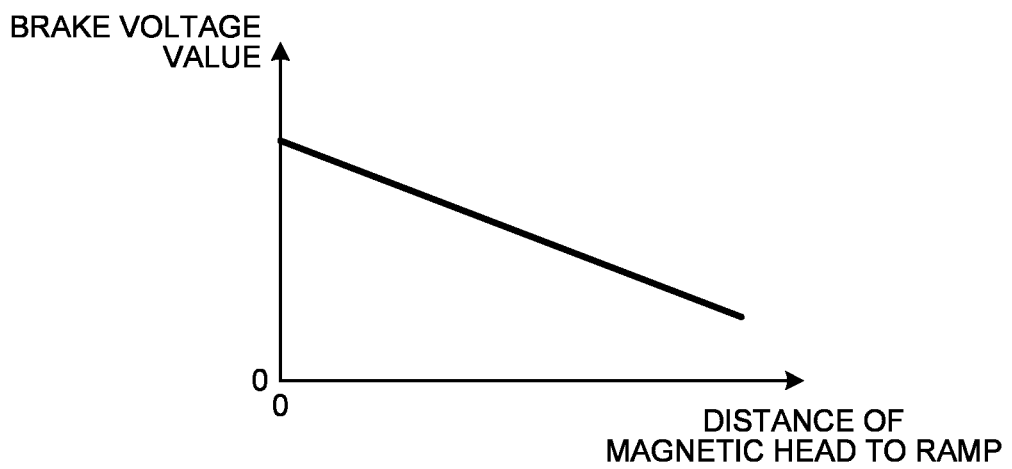
FIG. 8 is a diagram illustrating an example of a relationship between a distance of the magnetic head to a ramp and a brake voltage value according to the first embodiment.

In another example, the processor 26 acquires the distance of the magnetic head 22 to the ramp 13, and calculates the brake voltage value based on the acquired distance of the magnetic head 22 to the ramp 13. For example, as illustrated in FIG. 8, the brake voltage value increases as the distance of the magnetic head 22 to the ramp 13 decreases. As the distance of the magnetic head 22 to the ramp 13 decreases, a distance that the magnetic head 22 can move while being decelerated decreases, and thus, a strong brake is required. According to this calculation method, as the distance of the magnetic head 22 to the ramp 13 decreases, a stronger brake can be applied.

The relationship between the distance of the magnetic head 22 to the ramp 13 and the brake voltage value is not limited to the linear relationship as illustrated in FIG. 8. For example, the relationship between the distance of the magnetic head 22 to the ramp 13 and the brake voltage value may be defined so that the brake voltage value is changed stepwise according to the distance of the magnetic head 22 to the ramp 13.

In still another example, the processor 26 may calculate the brake voltage value based on both the moving speed of the magnetic head 22 in the reverse direction and the distance of the magnetic head 22 to the ramp 13. For example, the processor 26 may calculate the brake voltage value based on both the relationship illustrated in FIG. 7 and the relationship illustrated in FIG. 8.

A method of acquiring the moving speed of the magnetic head 22 in the reverse direction and the distance of the magnetic head 22 to the ramp 13 by the processor 26 is not limited to a specific method. For example, in the positioning control and the like, the processor 26 estimates a current state quantity (for example, a position, a moving speed, or both) of the magnetic head 22 by calculation, and calculates a target position of the magnetic head 22 based on the estimated state quantity. The processor 26 can acquire the moving speed of the magnetic head 22 in the reverse direction and the distance of the magnetic head 22 to the ramp 13 by the same algorithm as the algorithm for calculating the current state quantity of the magnetic head 22 in the positioning control.

The description returns to FIG. 6.

When the calculation of the brake voltage value is completed, the processor 26 executes the control of the brake operation on the motor driver 21 (S103). That is, the processor 26 transmits the brake voltage value as the second instruction value to the motor driver 21 to cause the motor driver 21 to execute the brake operation.

The control of the brake operation may be continued until any timing prior to the timing at which the retract operation starts. The period during which the control of the brake operation is continued, that is, the execution period of the brake operation is set by an arbitrary method from the period up to the timing at which the retract operation starts. For example, the execution period of the brake operation may be fixed to a predetermined short period. Alternatively, the processor 26 may determine the execution period of the brake operation based on the moving speed, the position, or both of them of the magnetic head 22. The processor 26 may continue the control of the brake operation until the timing at which the retract operation starts.

Subsequently, the processor 26 determines whether the motor driver 21 detects that the voltage value of the power supply voltage has fallen below the threshold Thd (S104).

When the voltage value of the power supply voltage falls below the threshold Thd, the motor driver 21 starts the retract operation. That is, S104 corresponds to processing for the processor 26 to recognize the timing at which the motor driver 21 starts the retract operation.

When detecting that the voltage value of the power supply voltage has fallen below the threshold Thd, the motor driver 21 notifies the processor 26 that the voltage value of the power supply voltage has fallen below the threshold Thd. In S104, the processor 26 determines, based on the notification, whether the motor driver 21 detects that the voltage value of the power supply voltage has fallen below the threshold Thd.

A method of transferring the notification from the motor driver 21 to the processor 26 is not limited to a specific method. In one example, the motor driver 21 includes a register, and when the voltage value of the power supply voltage falls below the threshold Thd, a value indicating that the voltage value of the power supply voltage has fallen below the threshold Thd is set in the register. The processor 26 refers to the value of the register at predetermined time intervals. Then, when acquiring a value indicating that the voltage value of the power supply voltage has fallen below the threshold Thd by reference to the register, the processor 26 can know that the motor driver 21 detects that the voltage value of the power supply voltage has fallen below the threshold Thd.

When the motor driver 21 detects that the voltage value of the power supply voltage has fallen below the threshold Thd (S104: Yes), the processor 26 terminates the operation.

When the motor driver 21 does not detect that the voltage value of the power supply voltage has fallen below the threshold Thd even after the processor 26 waits for a predetermined time (S104: No), the control proceeds to S101.

For example, after the voltage value of the power supply voltage falls below the threshold Thp, the voltage value of the power supply voltage may return to the voltage value of the rated voltage without falling below the threshold Thd. In this case, it can be estimated that no power interruption has occurred. Thus, when having determined No in the processing of S104, the processor 26 terminates the operation related to the Power interruption, and the control proceeds to S101. When the control proceeds to S101, the processor 26 may resume the positioning control.

Figure 9:
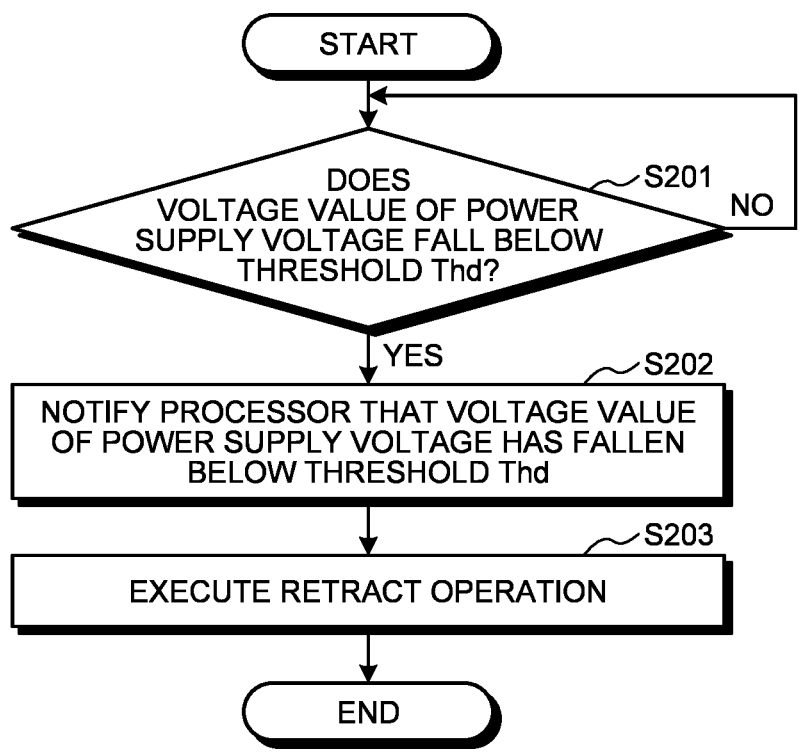
FIG. 9 is a flowchart illustrating an example of an operation of a motor driver according to the first embodiment.

FIG. 9 is a flowchart illustrating an example of the operation of the motor driver 21 according to the first embodiment.

The motor driver 21 determines whether the voltage value of the power supply voltage falls below the threshold Thd (S201). When the voltage value of the power supply voltage is not below the threshold Thd (S201: No), the control returns to S201. The motor driver 21 repeatedly executes the processing of S201 until it is determined that the voltage value of the power supply voltage has fallen below the threshold Thd.

Until the motor driver 21 determines No in the processing of S201, the motor driver 21 controls the drive voltage of the motor driver 21 based on the instruction value (the first instruction value or the second instruction value) from the processor 26. In particular, when the voltage value of the power supply voltage falls below the threshold Thp, the motor driver 21 performs the brake operation based on the second instruction value from the processor 26.

When the voltage value of the power supply voltage falls below the threshold Thd (S201: Yes), the motor driver 21 notifies the processor 26 that the voltage value of the power supply voltage has fallen below the threshold Thd (S202), and executes the retract operation (S203). When the magnetic head 22 rides on the ramp 13 by the retract operation, the motor driver 21 terminates the operation.

As described above, according to the first embodiment, when the voltage value of the power supply voltage falls below the threshold Thd, the motor driver 21 starts the retract operation by controlling the drive voltage applied to the VCM 16. When the voltage value of the power supply voltage falls below the threshold Thp larger than the threshold Thd, the processor 26 transmits the second instruction value to the motor driver to cause the motor driver 21 to execute the brake operation.

As a result, the motor driver 21 reduces the speed of the magnetic head 22 according to the second instruction value from the processor 26 before the voltage value of the power supply voltage falls below the threshold Thd.

Thus, when the power interruption occurs, it is possible to apply a strong brake to the movement of the magnetic head 22. The moving speed of the magnetic head 22 when the magnetic head 22 rides on the ramp 13 can be appropriately suppressed so that the magnetic head 22 does not return to the magnetic disk 11 by recoiling at the ramp 13.

According to the first embodiment, in one example, the processor 26 acquires the moving speed of the magnetic head 22 toward the ramp 13, and calculates the brake voltage value based on at least the moving speed. Then, the processor 26 transmits the brake voltage value as the second instruction value to the motor driver. The motor driver 21 applies a drive voltage having a voltage value corresponding to the second instruction value to the VCM 16 before the retract operation.

As the moving speed of the magnetic head 22 in the reverse direction increases, a stronger brake can be applied to the movement of the magnetic head 22. Consequently, the moving speed of the magnetic head 22 when the magnetic head 22 rides on the ramp 13 can be appropriately suppressed so that the magnetic head 22 does not return to the magnetic disk 11 by recoiling at the ramp 13.

According to the first embodiment, in one example, the processor 26 acquires the distance of the magnetic head 22 to the ramp 13, and calculates the brake voltage value based on at least the distance. Then, the processor 26 transmits the brake voltage value as the second instruction value to the motor driver. The motor driver 21 applies a drive voltage having a voltage value corresponding to the second instruction value to the VCM 16 before the retract operation.

As the distance of the magnetic head 22 to the ramp 13 decreases, a stronger brake can be applied. Consequently, the moving speed of the magnetic head 22 when the magnetic head 22 rides on the ramp 13 can be appropriately suppressed so that the magnetic head 22 does not return to the magnetic disk 11 by recoiling at the ramp 13.

In the first embodiment, the threshold Vtp is an example of the second threshold. The threshold Vtd is an example of the first threshold. The VCM 16 is an example of a motor. The second instruction value is an example of the instruction value.

Second Embodiment

As described above, in the retract operation, the motor driver 21 calculates a state quantity (position or velocity) of the VCM 16 during a pulse-off period and uses the state quantity as a feedback input to determine the wave height of the pulse applied during a subsequent pulse-on period. Thus, when the first pulse is applied, the motor driver 21 is in a state where the state quantity of the VCM 16 has not been acquired.

In the comparative example, a fixed initial value is used as the wave height of the first pulse, for example. The control of the wave height according to the position or the moving speed of the magnetic head is possible in the second and subsequent pulses. That is, the timing at which a strong brake can be applied is delayed. Thus, in a situation where a sudden brake is required, the moving speed of the magnetic head when the magnetic head rides on the ramp may not be reduced to an appropriate level.

In a second embodiment, in order to apply a strong brake at earlier timing than in the comparative example, when starting application of a plurality of pulses to the VCM 16 in the retract operation, the motor driver 21 controls the wave height of the first pulse according to a brake strength value instructed in advance from the processor 26 before the retract operation starts. That is, when the power interruption occurs, the processor 26 calculates the necessary brake strength before the retract operation starts. The processor 26 transmits the calculated brake strength as a brake, strength value to the motor driver 21.

Figure 10:
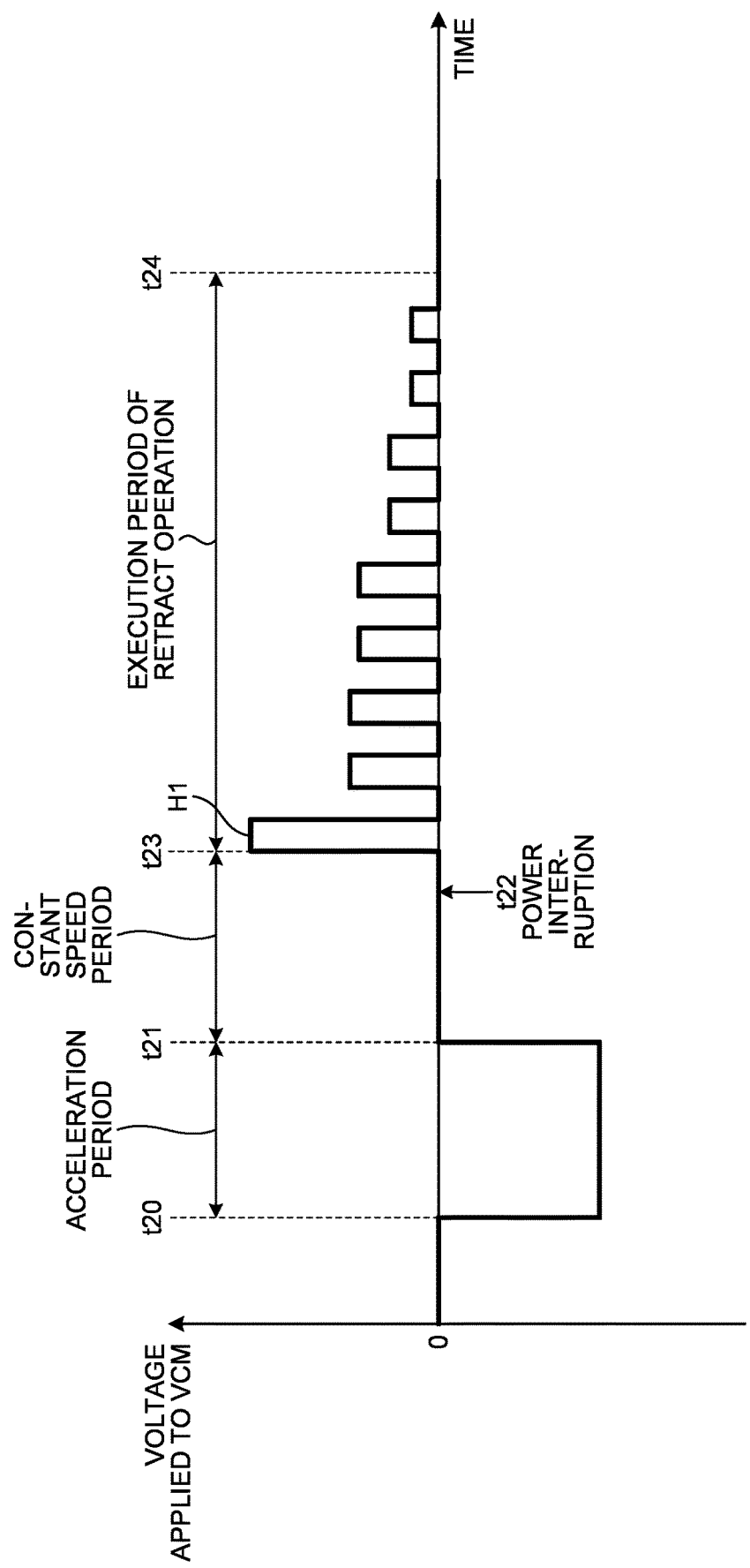
FIG. 10 is a diagram illustrating an example of transition of a voltage applied to a VCM of a second embodiment when the power interruption occurs during the seek control illustrated in FIG. 3.

FIG. 10 is a diagram illustrating an example of transition of the voltage applied to the VCM 16 of the second embodiment when the power interruption occurs during the seek control illustrated in FIG. 3. In FIG. 10, a vertical axis represents the drive voltage applied to the VCM 16. A horizontal axis represents an elapsed time.

At timing t20 and timing t21, the processor 26 executes processing similar to the processing executed at the timing t0 and timing t1 illustrated in FIG. 4. As a result, a period in which the magnetic head 22 moves at a constant speed starts from the timing t21.

When the power interruption occurs at certain timing t22 in a period in which the magnetic head 22 moves at a constant speed, the processor 26 terminates the seek control, calculates the brake strength value, and transmits the brake strength value obtained by the calculation to the motor driver 21.

When the voltage value of the power supply voltage falls below the threshold Thd (timing t23), the motor driver 21 starts the retract operation. That is, the motor driver 21 starts to apply pulses a plurality of times. The motor driver 21 applies a pulse having a wave height H1 corresponding to the brake strength value to the VCM 16 as a first pulse. The motor driver 21 controls the wave height of the second and subsequent pulses based on the state quantity of the VCM 16 obtained in the immediately preceding pulse-off period.

When the magnetic head 22 rides on the ramp 13 (timing t24), the retract operation is terminated.

In this manner, the first pulse applied to the VCM 16 in the retract operation can be controlled.

Next, the operation of the magnetic disk device 1 according to the second embodiment will be described.

Figure 11:
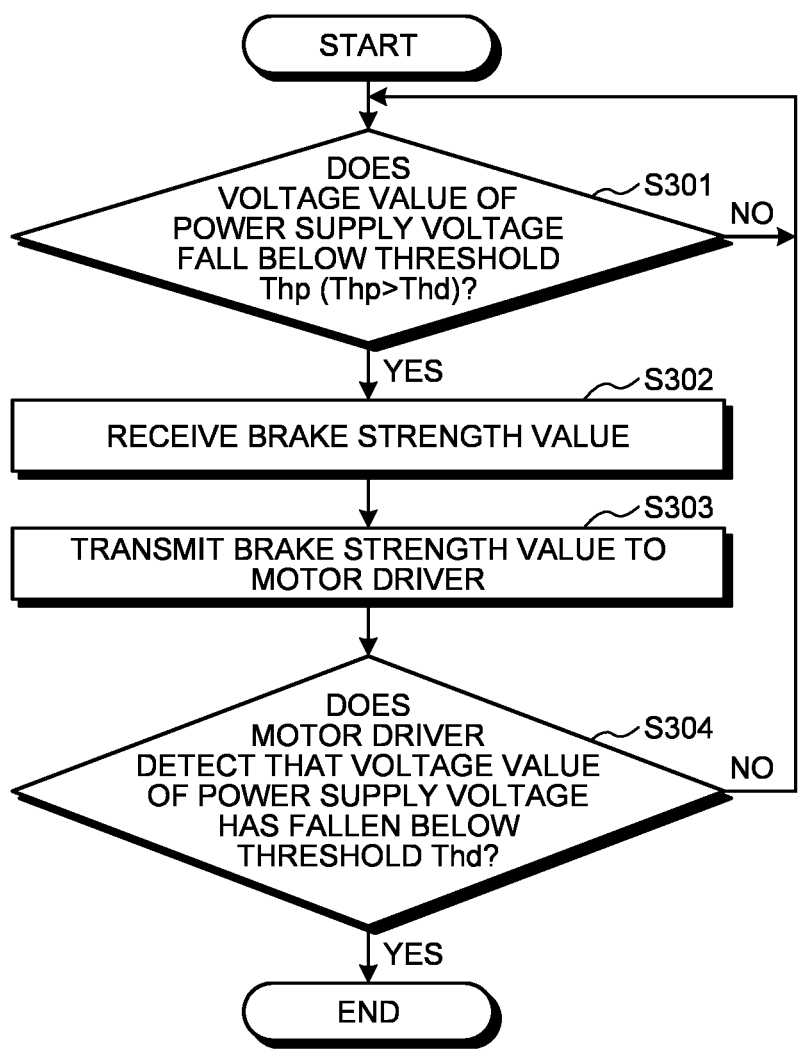
FIG. 11 is a flowchart illustrating an example of an operation of a processor according to the second embodiment.

FIG. 11 is a flowchart illustrating an example of the operation of the processor 26 according to the second embodiment.

The processor 26 determines whether the voltage value of the power supply voltage falls below the threshold Thp in the same manner as in S101 (S301). When the voltage value of the power supply voltage is not below the threshold Thp (S301: No), the control returns to S301. The processor 26 repeatedly executes the processing of S301 until it is determined that the voltage value of the power supply voltage has fallen below the threshold Thp regardless of whether the positioning control is being performed.

When the voltage value of the power supply voltage falls below the threshold Thp (S301: Yes), the processor 26 calculates the brake strength value (S302).

As a method of calculating the brake strength value, various methods can be adopted. The processor 26 can calculate the brake strength value in a manner similar to the manner of calculating the brake voltage value of the first embodiment. That is, in the method of calculating the brake voltage value of the first embodiment described with reference to FIGS. 7 and 8, a calculation method obtained by replacing the brake voltage value with the brake strength value can be used as a method of calculating the brake strength value.

The brake strength value may be expressed by a value selected from a plurality of levels such as a strong brake, an intermediate brake, and a weak brake, or may be expressed as numerical information using multiple bits.

Subsequently, the processor 26 transmits the brake strength value obtained by the calculation to the motor driver 21 (S303).

Then, the processor 26 determines whether the motor driver 21 detects that the voltage value of the power supply voltage has fallen below the threshold Thd, as in S104 (S304).

When the motor driver 21 detects that the voltage value of the power supply voltage has fallen below the threshold Thd (S304: Yes), the processor 26 terminates the operation.

When the motor driver 21 does not detect that the voltage value of the power supply voltage has fallen below the threshold Thd even after the processor 26 waits for a predetermined time (S304: No), it can be estimated that the power interruption has not occurred, and thus, the control proceeds to S301.

When the control proceeds to S301, the processor 26 may resume the positioning control.

Figure 12:
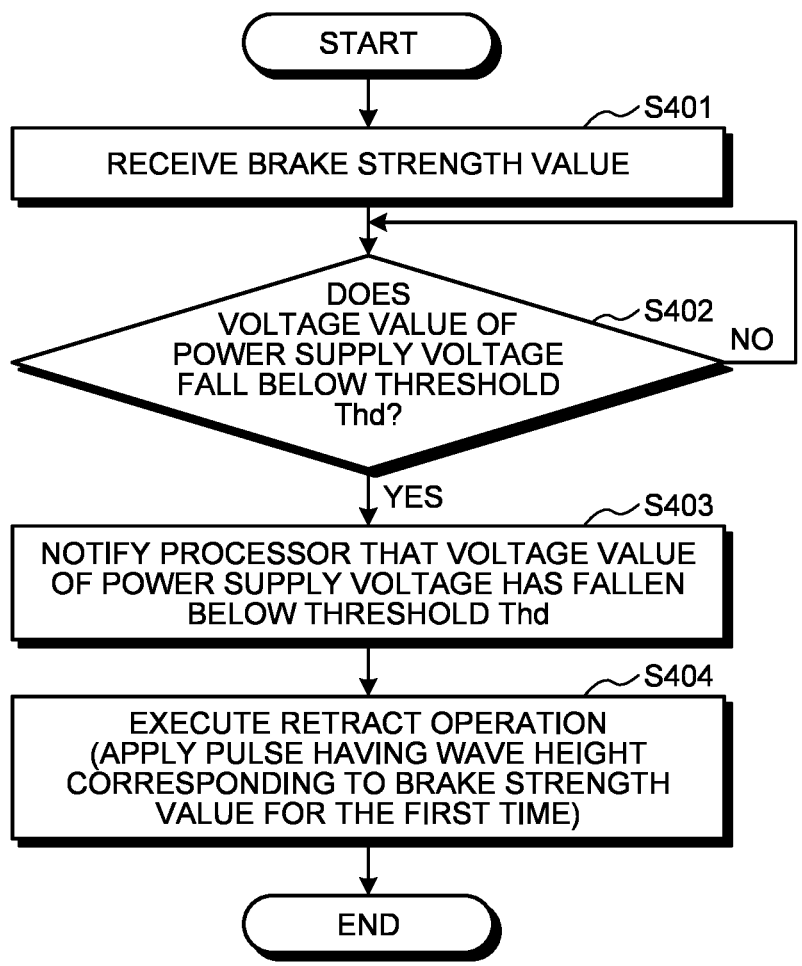
FIG. 12 is a flowchart illustrating an example of an operation of a motor driver according to the second embodiment.

FIG. 12 is a flowchart illustrating an example of the operation of the motor driver 21 according to the second embodiment.

When the voltage value of the power supply voltage falls below the threshold Thp, the motor driver 21 receives the brake strength value from the processor 26 by the processing of S303 of the processor 26 (S401). Then, the motor driver 21 determines whether the voltage value of the power supply voltage falls below the threshold Thd (S402). When the voltage value of the power supply voltage is not below the threshold Thd (S402: No), the control returns to S402. The motor driver 21 repeatedly executes the processing of S402 until it is determined that the voltage value of the power supply voltage has fallen below the threshold Thd.

Until the motor driver 21 determines No in the processing of S402, the motor driver 21 can control the drive voltage of the motor driver 21 based on the instruction value (first instruction value) from the processor 26.

When the voltage value of the power supply voltage falls below the threshold Thd (S402: Yes), the motor driver 21 notifies the processor 26 that the voltage value of the power supply voltage has fallen below the threshold Thd (S403), and executes the retract operation (S404).

When the first pulse of the retract operation is applied, the motor driver 21 applies a pulse having the wave height H1 corresponding to the brake strength value to the VCM 16. For example, the motor driver 21 increases the wave height H1 as the brake strength value increases.

When the retract operation is completed, the motor driver 21 terminates the operation.

As described above, according to the second embodiment, when the voltage value of the power supply voltage falls below the threshold Thp, the processor 26 calculates the brake strength value and transmits the brake strength value to the motor driver 21. The motor driver 21 applies a pulse having a wave height corresponding to the brake strength value to the VCM 16 in the first application of a plurality of applied pulses.

Thus, it is possible to apply a strong brake to the movement of the magnetic head 22 at early timing. The moving speed of the magnetic head 22 when the magnetic head 22 rides on the ramp 13 can be appropriately suppressed so that the magnetic head 22 does not return to the magnetic disk 11 by recoiling at the ramp 13.

According to the second embodiment, in one example, the processor 26 acquires the moving speed of the magnetic head 22 in the reverse direction, and calculates the brake strength value based on at least the moving speed.

Thus, as the moving speed of the magnetic head 22 in the reverse direction increases, a stronger brake can be applied to the movement of the magnetic head 22. Consequently, the moving speed of the magnetic head 22 when the magnetic head 22 rides on the ramp 13 can be appropriately suppressed so that the magnetic head 22 does not return to the magnetic disk 11 by recoiling at the ramp 13.

According to the second embodiment, in one example, the processor 26 acquires the distance of the magnetic head 22 to the ramp 13, and calculates the brake strength value based on at least the distance.

Thus, as the distance of the magnetic head 22 to the ramp 13 decreases, a stronger brake can be applied. Consequently, the moving speed of the magnetic head 22 when the magnetic head 22 rides on the ramp 13 can be appropriately suppressed so that the magnetic head 22 does not return to the magnetic disk 11 by recoiling at the ramp 13.

In the second embodiment, the threshold Vtp is an example of the second threshold. The threshold Vtd is an example of the first threshold. The VCM 16 is an example of a motor. The brake strength value is an example of the instruction value.

As described above, according to the first embodiment and the second embodiment, when the voltage value of the power supply voltage falls below the threshold Thp larger than the threshold Thd used for determining the timing to start the retract operation, the processor 26 transmits the instruction related to applying a brake to the movement of the magnetic head 22 to the motor driver 21. In the first embodiment, the instruction related to applying a brake to the movement of the magnetic head 22 is a brake instruction value for implementing the brake operation. In the second embodiment, the instruction is the brake strength value for controlling the wave height of the pulse applied to the VCM 16 for the first time in the retract operation. The motor driver 21 receives the instruction related to applying a brake to the movement of the magnetic head 22 before starting the retract operation, and performs processing according to the instruction.

Thus, according to the first embodiment and the second embodiment, it is possible to apply a strong brake to the movement of the magnetic head 22 when the power interruption occurs. The moving speed of the magnetic head 22 when the magnetic head 22 rides on the ramp 13 can be appropriately suppressed so that the magnetic head 22 does not return to the magnetic disk 11 by recoiling at the ramp 13.

For example, according to the first embodiment, when the power interruption occurs while the magnetic head 22 moves in the reverse direction, the motor driver 21 applies a brake to the movement of the magnetic head 22, and then applies a plurality of pulses to the VCM 16 by the retract operation. That is, it is possible to apply a brake to the movement of the magnetic head 22 before the retract operation.

For example, according to the second embodiment, when the power interruption occurs while the magnetic head 22 moves in the reverse direction, the motor driver 21 can change the wave height of the pulse applied to the VCM 16 for the first time in the retract operation according to the moving speed of the magnetic head 22 when the power interruption occurs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk;
a magnetic head that accesses the magnetic disk;
a motor that moves the magnetic head;
a ramp;
a motor driver that starts a retract operation of retracting the magnetic head to the ramp by controlling a voltage applied to the motor when a voltage value of a power supply voltage falls below a first threshold; and
a processor that transmits, to the motor driver, an instruction related to applying a brake to movement of the magnetic head when the voltage value of the power supply voltage falls below a second threshold larger than the first threshold, wherein
the motor driver reduces a speed of the magnetic head according to the instruction before the voltage value of the power supply voltage falls below the first threshold.

2. The magnetic disk device according to claim 1,
wherein the processor acquires a moving speed of the magnetic head toward the ramp when the voltage value of the power supply voltage falls below the second threshold, and calculates an instruction value based on at least the moving speed, and
the instruction includes the instruction value, and
the motor driver applies a voltage of a voltage value corresponding to the instruction value to the motor before the voltage value of the power supply voltage falls below the first threshold.

3. The magnetic disk device according to claim 2,
wherein the processor calculates the instruction value such that an intensity of the brake applied to the movement of the magnetic head increases as the moving speed increases.

4. The magnetic disk device according to claim 1,
wherein the processor acquires a distance of the magnetic head to the ramp when the voltage value of the power supply voltage falls below the second threshold, and calculates an instruction value based on at least the distance, and
the instruction includes the instruction value, and
the motor driver applies a voltage of a voltage value corresponding to the instruction value to the motor before the voltage value of the power supply voltage falls below the first threshold.

5. The magnetic disk device according to claim 4,
wherein the processor calculates the instruction value such that an intensity of the brake applied to the movement of the magnetic head increases as the distance decreases.

6. A magnetic disk device comprising:
a magnetic disk;
a magnetic head that accesses the magnetic disk;
a motor that moves the magnetic head;
a ramp;
a motor driver that starts a retract operation of retracting the magnetic head to the ramp by controlling a voltage applied to the motor when a voltage value of a power supply voltage falls below a first threshold; and
a processor that transmits, to the motor driver, an instruction related to applying a brake to movement of the magnetic head when the voltage value of the power supply voltage falls below a second threshold larger than the first threshold, wherein
the processor acquires a moving speed of the magnetic head toward the ramp when the voltage value of the power supply voltage falls below the second threshold, and calculates an instruction value based on at least the moving speed, and
the instruction includes the instruction value, and
the motor driver applies a voltage of a voltage value corresponding to the instruction value to the motor before the voltage value of the power supply voltage falls below the first threshold.

7. The magnetic disk device according to claim 6,
wherein the processor acquires a distance of the magnetic head to the ramp when the voltage value of the power supply voltage falls below the second threshold, and calculates the instruction value based on the moving speed and the distance.

8. A magnetic disk device comprising:
a magnetic disk;
a magnetic head that accesses the magnetic disk;
a motor that moves the magnetic head;
a ramp;
a motor driver that starts a retract operation of retracting the magnetic head to the ramp by controlling a voltage applied to the motor when a voltage value of a power supply voltage falls below a first threshold; and
a processor that transmits, to the motor driver, an instruction related to applying a brake to movement of the magnetic head when the voltage value of the power supply voltage falls below a second threshold larger than the first threshold, wherein
the motor driver applies a voltage of a pulsed waveform to the motor a plurality of times in the retract operation, and controls a wave height of a voltage of a pulsed waveform to be applied first among the voltages of the pulsed waveforms applied the plurality of times according to the instruction.

9. The magnetic disk device according to claim 8,
wherein the processor acquires a moving speed of the magnetic head toward the ramp when the voltage value of the power supply voltage falls below the second threshold, and calculates an instruction value based on at least the moving speed, and
the instruction includes the instruction value, and
the motor driver applies a voltage of a pulsed waveform to the motor a plurality of times in the retract operation, and applies a voltage of a pulsed waveform having a wave height corresponding to the instruction value to the motor at a first time among the plurality of times of application of voltages.

10. The magnetic disk device according to claim 9,
wherein the processor acquires a distance of the magnetic head to the ramp when the voltage value of the power supply voltage falls below the second threshold, and calculates the instruction value based on the moving speed and the distance.

11. The magnetic disk device according to claim 9,
wherein the processor calculates the instruction value such that an intensity of the brake applied to the movement of the magnetic head increases as the moving speed increases.

12. The magnetic disk device according to claim 8,
wherein the processor acquires a distance of the magnetic head to the ramp when the voltage value of the power supply voltage falls below the second threshold, and calculates an instruction value based on at least the distance, and
the instruction includes the instruction value, and
the motor driver applies a voltage of a pulsed waveform to the motor a plurality of times in the retract operation, and applies a voltage of a pulsed waveform having a wave height corresponding to the instruction value to the motor at a first time among the plurality of times of application of voltages.

13. The magnetic disk device according to claim 12,
wherein the processor calculates the instruction value such that an intensity of the brake applied to the movement of the magnetic head increases as the distance decreases.

14. A magnetic disk device comprising:
a magnetic disk;
a magnetic head that accesses the magnetic disk;
a motor that moves the magnetic head;
a ramp; and
a motor driver that applies a brake to the movement of the magnetic head when a power interruption occurs while the magnetic head moves in a direction toward the ramp and retracts the magnetic head to the ramp by applying a voltage of a pulsed waveform to the motor a plurality of times after the brake is applied to the movement of the magnetic head.

15. A magnetic disk device comprising:
a magnetic disk;
a magnetic head that accesses the magnetic disk;
a motor that moves the magnetic head;
a ramp; and
a motor driver that applies a brake to the movement of the magnetic head when a power interruption occurs while the magnetic head moves in a direction toward the ramp, and then, retracts the magnetic head to the ramp by applying a voltage of a pulsed waveform to the motor a plurality of times,
wherein the motor driver changes a wave height of a voltage of a pulsed waveform applied to the motor for a first time among the voltages of the pulsed waveform applied to the motor a plurality of times, according to a moving speed of the magnetic head when the power interruption occurs.

\* \* \* \* \*